United States Patent [19]

Gibbons et al.

[11] Patent Number: 5,634,434
[45] Date of Patent: Jun. 3, 1997

[54] SELF CLOSING DOG HOUSE DOOR

[76] Inventors: John J. Gibbons; Beverly Lallemand, both of 418 Palmer Ave., Patton, Pa. 16668

[21] Appl. No.: 604,769

[22] Filed: Feb. 22, 1996

[51] Int. Cl.$^6$ .................................................. A01K 1/03
[52] U.S. Cl. ........................ 119/501; 49/366; 160/DIG. 8
[58] Field of Search ................................... 119/501, 524, 119/481, 494, 482, 496, 165, 621, 622; 49/366; 160/116, 180, 327, 354, 368.1, DIG. 8

[56] References Cited

U.S. PATENT DOCUMENTS

| | | | |
|---|---|---|---|
| 1,535,045 | 4/1925 | Scjeodecler | 160/180 |
| 1,796,043 | 3/1931 | Murphy | 49/366 |
| 2,560,661 | 7/1951 | Poovey | 119/501 X |
| 2,748,854 | 6/1956 | Lynch | 119/501 X |
| 3,362,108 | 1/1968 | Jones | 49/366 |
| 3,487,581 | 1/1970 | Ellingson, Jr. | 49/366 |
| 4,402,159 | 9/1983 | Domagalski | 160/327 X |

*Primary Examiner*—Robert P. Swiatek
*Assistant Examiner*—Yvonne R. Abbott

[57] ABSTRACT

A self closing dog house door including a pair of sheeting members secured over an opening in a dog house. Each of the sheeting members has an upper edge, a lower edge, an inner edge, and an outer edge. The inner edge of each of the sheeting members has an elongated recess formed therein whereby the elongated recess of the sheeting members is disposed over the opening in the dog house. A pair of flexible plastic doors are secured within the elongated recess of the pair of sheeting members. Each plastic door has a vertically oriented aperture therethrough. A pair of elongated spring mechanisms each is positioned within a vertically oriented aperture of the pair of flexible plastic doors.

4 Claims, 3 Drawing Sheets

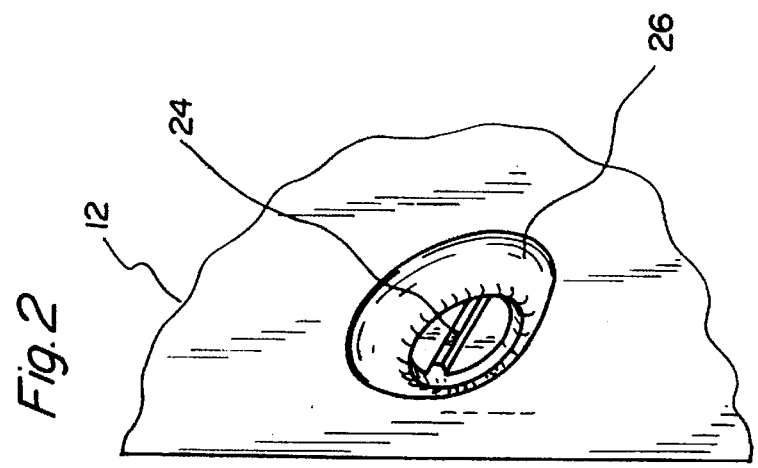
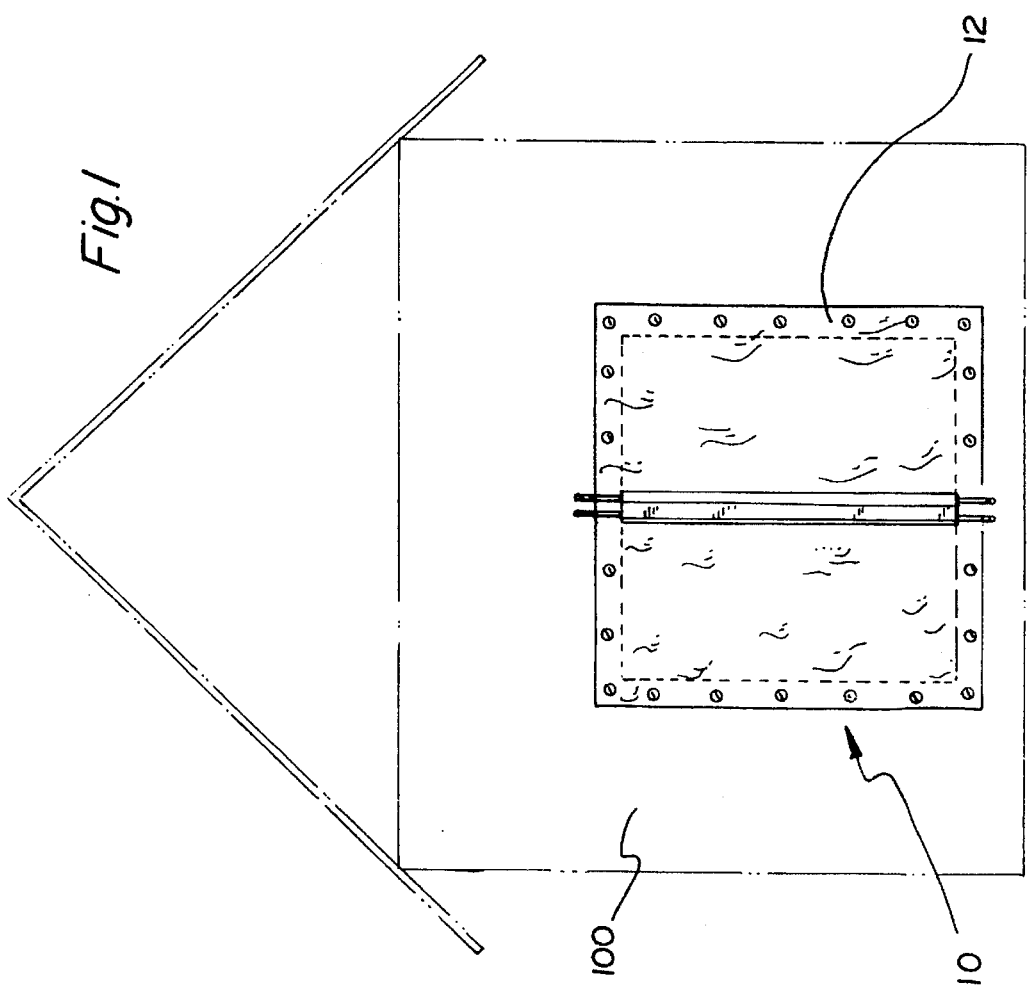

SELF CLOSING DOG HOUSE DOOR

BACKGROUND OF THE INVENTION

1. Field of the Invention

The present invention relates to a self closing dog house door and more particularly pertains to providing an articulatable slit for allowing a pet to pass therethrough with a self closing dog house door.

2. Description of the Prior Art

The use of pet doors is known in the prior art. More specifically, pet doors heretofore devised and utilized for the purpose of covering an opening in a pet's house are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,117,890 to Taylor et al. discloses a pet door.

U.S. Pat. No. 4,776,133 to Green discloses a pet door.

Des. U.S. Pat. No. 334,431 to Davlantes discloses the ornamental design for a combined pet door frame and flap.

U.S. Pat. No. 5,287,654 to Davlantes discloses a pet access door frame modular unit.

U.S. Pat. No. 3,811,224 to Garrison discloses a pet door panel.

U.S. Pat. No. 3,978,616 to Pennock discloses a pet door.

While these devices fulfill their respective, particular objective and requirements, the aforementioned patents do not describe a self closing dog house door for providing an articulatable slit for allowing a pet to pass therethrough.

In this respect, the self closing dog house door according to the present invention substantially departs from the conventional concepts and designs of the prior art, and in doing so provides an apparatus primarily developed for the purpose of providing an articulatable slit for allowing a pet to pass therethrough.

Therefore, it can be appreciated that there exists a continuing need for new and improved self closing dog house door which can be used for providing an articulatable slit for allowing a pet to pass therethrough. In this regard, the present invention substantially fulfills this need.

SUMMARY OF THE INVENTION

In the view of the foregoing disadvantages inherent in the known types of pet doors now present in the prior art, the present invention provides an improved self closing dog house door. As such, the general purpose of the present invention, which will be described subsequently in greater detail, is to provide a new and improved self closing dog house door and method which has all the advantages of the prior art and none of the disadvantages.

To attain this, the present invention essentially comprises a pair of sheeting members secured over an opening in a dog house. Each of the sheeting members has an upper edge, a lower edge, an inner edge, and an outer edge. The upper edge, lower edge, and outer edge have a support member secured therein. The inner edge of each of the sheeting members have an elongated recess formed therein whereby the elongated recess of the sheeting members is disposed over the opening in the dog house. A pair of flexible plastic housings are secured within the elongated recess of the pair of sheeting members. Each plastic housing has a vertically oriented aperture therethrough. A pair of elongated spring mechanisms each is positioned within a vertically oriented aperture of the pair of flexible plastic housings. A pair of rubber door members are secured to an inner edge of the pair of flexible plastic housings. Each of the rubber door members has a wide end portion secured to the flexible plastic housing and a tapered end portion extending inwardly from the wide end portion whereby the pair of rubber door members form a closure over the opening in the dog house.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self closing dog house door which has all the advantages of the prior art pet doors and none of the disadvantages.

It is another object of the present invention to provide a new and improved self closing dog house door which may be easily and efficiently manufactured and marketed.

It is a further object of the present invention to provide a new and improved self closing dog house door which is of durable and reliable construction.

An even further object of the present invention is to provide a new and improved self closing dog house door which is susceptible of a low cost of manufacture with regard to both materials and labor, and which accordingly is then susceptible of low prices of sale to the consuming public, thereby making such a self closing dog house door economically available to the buying public.

Still yet another object of the present invention is to provide a new and improved self closing dog house door which provides in the apparatuses and methods of the prior art some of the advantages thereof, while simultaneously overcoming some of the disadvantages normally associated therewith.

Even still another object of the present invention is to provide a new and improved self closing dog house door for providing an articulatable slit for allowing a pet to pass therethrough.

Lastly, it is an object of the present invention to provide a new and improved self closing dog house door including a pair of sheeting members secured over an opening in a dog house. Each of the sheeting members has an upper edge, a lower edge, an inner edge, and an outer edge. The inner edge of each of the sheeting members has an elongated recess formed therein whereby the elongated recess of the sheeting members is disposed over the opening in the dog house. A pair of flexible plastic doors are secured within the elongated recess of the pair of sheeting members. Each plastic door has a vertically oriented aperture therethrough. A pair of elongated spring mechanisms each is positioned within a vertically oriented aperture of the pair of flexible plastic doors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of the preferred embodiment of the self closing dog house door constructed in accordance with the principles of the present invention.

FIG. 2 is a perspective view of the screw used to secure the vinyl sheeting to a dog house.

The same reference numerals refer to the same parts through the various Figures.

DESCRIPTION OF THE PREFERRED EMBODIMENT

Figure 4:
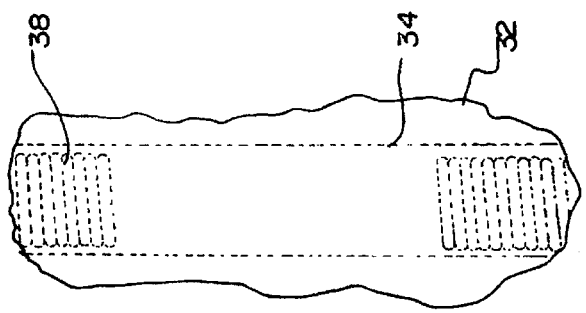
FIG. 4 is an enlarged fragmentary view of the elongated spring mechanism.
Figure 3:
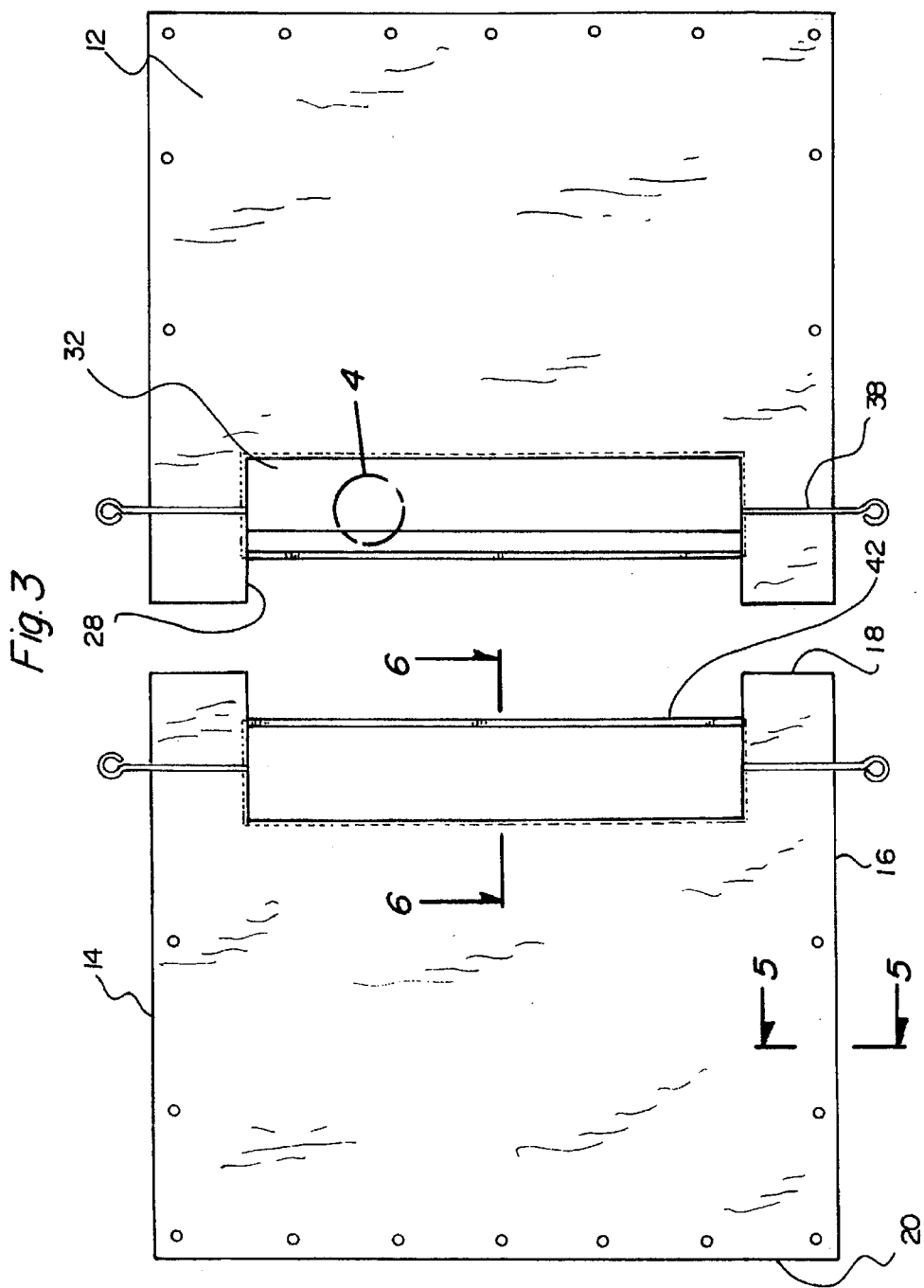
FIG. 3 is a front elevation view of the present invention.
Figure 5:
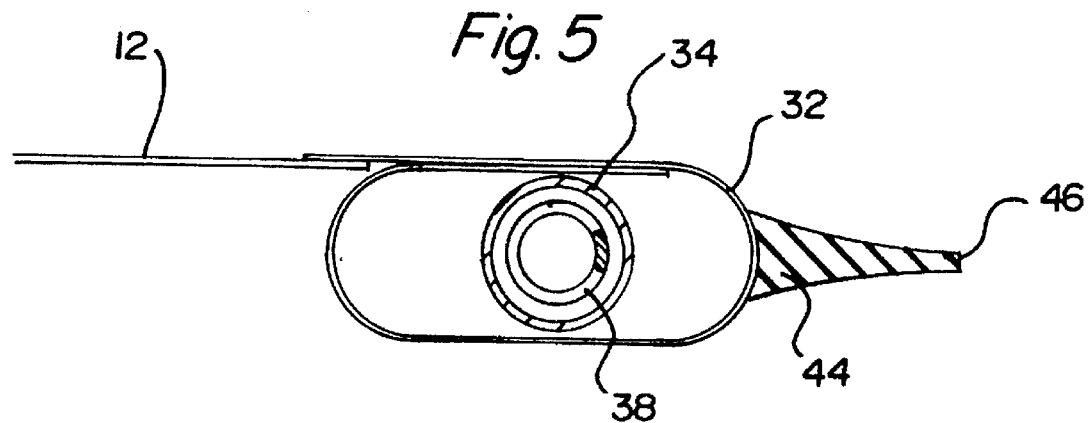
FIG. 5 is a cross-sectional view as taken along line 6—6 of FIG. 3.
Figure 6:
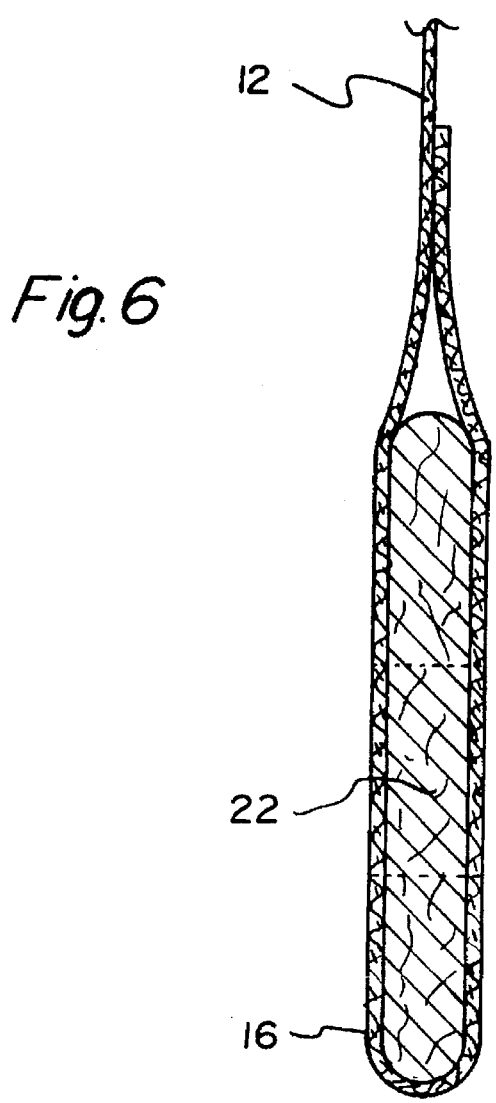
FIG. 6 is a cross-sectional view as taken along line 5—5 of FIG. 3.

With reference now to the drawings, and in particular, to FIGS. 1–6 thereof, the preferred embodiment of the new and improved self closing dog house door embodying the principles and concepts of the present invention and generally designated by the reference number 10 will be described.

Specifically, it will be noted in the various Figures that the device relates to a new and improved self closing dog house door for providing an articulatable slit for allowing a pet to pass therethrough. In its broadest context, the device consists of a pair of sheeting members, a pair of flexible plastic housings, a pair of elongated spring mechanisms, and a pair of rubber door members. Such components are individually configured and correlated with respect to each other so as to attain the desired objective.

The device 10 includes a pair of sheeting members 12 secured over an opening in a dog house 100. Each of the sheeting members 12 has an upper edge 14, a lower edge 16, an inner edge 18, and an outer edge 20. The upper edge 14, lower edge 16, and outer edge 20 have a support member 22 secured therein. The support member 22 is preferably a piece of cardboard that the edges of the sheeting members 12 are doubled over and stitched closed over. The sheeting members 12 are secured to the dog house 100 by screws 24 extending through the support member 22 to couple with the dog house 100. The screws 24 will be preferably set through a finish washer 26 as illustrated in FIG. 2. The inner edge 18 of each of the sheeting members 12 have an elongated recess 28 formed therein whereby the elongated recess 28 of the sheeting members 12 is disposed over the opening in the dog house 100. The elongated recess 28 has a length greater than half of the length of the inner edge 18. The preferable construction of the sheeting members 12 is of a durable vinyl.

A pair of flexible plastic housings 32 are secured within the elongated recess 28 of the pair of sheeting members 12. Each plastic housing 32 has a vertically oriented aperture 34 therethrough. When the plastic housings 32 are within the elongated recesses 28, they serve to cover most of the opening exposed by the elongated recesses 28 leading into the opening in the dog house 100.

A pair of elongated spring mechanisms 38 each is positioned within a vertically oriented aperture 34 of the pair of flexible plastic housings 32. The spring mechanisms 38 serve to reorient the pair of flexible plastic housings 32 once the plastic housings 32 have been pushed apart.

Lastly, a pair of rubber door members 42 are secured to an inner edge of the pair of flexible plastic housings 32. Each of the rubber door members 42 has a wide end portion 44 secured to the flexible plastic housing 32 and a tapered end portion 46 extending inwardly from the wide end portion 44 whereby the pair of rubber door members 42 form a closure over the opening in the dog house 100. The rubber door members 42 allow a dog or other pet to press their nose against to push through the pair of plastic flexible housings 32 to either enter or exit the dog house 100. The spring mechanisms 38 will bend allowing the housings 32 to pivot thereby allowing the pet to enter or exit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A self closing dog house door for providing an articulatable slit for allowing a pet to pass therethrough comprising, in combination:

a pair of sheeting members secured over an opening in a dog house, each of the sheeting members having an upper edge, a lower edge, an inner edge, and an outer edge, the upper edge, lower edge, and outer edge having a support member secured therein, the inner edge of each of the sheeting members having an elongated recess formed therein whereby the elongated recess of the sheeting members being disposed over the opening in the dog house;

a pair of flexible plastic housings secured within the elongated recess of the pair of sheeting members, each plastic housing having a vertically oriented aperture therethrough;

a pair of elongated spring mechanisms each being positioned within a vertically oriented aperture of the pair of flexible plastic housings;

a pair of rubber door members secured to an inner edge of the pair of flexible plastic housings, each of the rubber door members having a wide end portion secured to the flexible plastic housing and a tapered end portion extending inwardly from the wide end portion whereby the pair of rubber door members forming a closure over the opening in the dog house.

2. A self closing dog house door comprising:

a pair of sheeting members secured over an opening in a dog house, each of the sheeting members having an upper edge, a lower edge, an inner edge, and an outer edge, the inner edge of each of the sheeting members having an elongated recess formed therein whereby the elongated recess of the sheeting members being disposed over the opening in the dog house;

a pair of flexible plastic doors secured within the elongated recess of the pair of sheeting members, each plastic door having a vertically oriented aperture therethrough;

a pair of elongated spring mechanisms each being positioned within a vertically oriented aperture of the pair of flexible plastic doors.

3. The dog house door as set forth in claim 2 wherein the upper edge, lower edge, and outer edge of the pair of sheeting members having a support member secured therein.

4. The dog house door as set forth in claim 2 and further including a pair of rubber door members secured to an inner edge of the pair of flexible plastic housings, each of the rubber door members having a wide end portion secured to the flexible plastic door and a tapered end portion extending inwardly from the wide end portion whereby the pair of rubber door members forming a closure over the opening in the dog house.

* * * * *